| United States Patent [19] | [11] | 4,148,134 |
|---|---|---|
| Metz | [45] | Apr. 10, 1979 |

[54] METHOD FOR FORMING A THERMOCOUPLE

[75] Inventor: Hugh J. Metz, Knoxville, Tenn.

[73] Assignee: The United States of America as represented by the United States Department of Energy, Washington, D.C.

[21] Appl. No.: 841,413

[22] Filed: Oct. 12, 1977

[51] Int. Cl.² .............................................. B01J 17/00
[52] U.S. Cl. ....................................... 29/573; 136/233
[58] Field of Search ........................... 29/573; 136/233

[56] References Cited

U.S. PATENT DOCUMENTS

| 3,774,297 | 11/1973 | Wagner | 29/573 |
| 3,939,554 | 2/1976 | Finney | 29/573 |
| 3,942,242 | 3/1976 | Rizzolo | 29/573 |

Primary Examiner—W. Tupman
Attorney, Agent, or Firm—Dean E. Carlson; Stephen D. Hamel; Louis M. Deckelmann

[57] ABSTRACT

A method is provided for producing a fast response, insulated junction thermocouple having a uniform diameter outer sheath in the region of the measuring junction. One step is added to the usual thermocouple fabrication process that consists in expanding the thermocouple sheath following the insulation removal step. This makes it possible to swage the sheath back to the original diameter and compact the insulation to the desired high density in the final fabrication step.

1 Claim, No Drawings

METHOD FOR FORMING A THERMOCOUPLE

BACKGROUND OF THE INVENTION

This invention was made in the course of, or under, a contract with the U.S. Energy Research and Development Administration.

There are two classes of sheathed thermocouples, namely: where the junction is welded to the sheath (gounded), and where the junction is insulated. The grounded junction thermocouples respond faster but insulated junction thermocouples are more reliable.

The current commercial manufacture of insulated junction thermocouples is that of cutting a section out of one end of the already-drawn sheathed stock, removing the insulation from the wires, welding the wires to form the junction, repacking the insulation, and making the end, or closure weld. Since the hand-packed insulation necessarily has a low density and therefore a subnormal heat transfer, the thermocouple has a relatively slow response time. A recent discovery as described in the patent application of Radford M. Carroll et al, Ser. No. 831,195, filed Sept. 7, 1977, now abandoned, entitled "Increasing the Response Rate of Insulated Junction Thermocouples," and having a common assignee with the present application, illustrated that the response rate of an already constructed, insulated junction thermocouple can be substantially increased by swaging the sheath thereof in the vicinity of the measuring junction in the amount of 4–8%. However, the reduced outer diameter at the measuring junction that results from such a swaging operation may be undesirable in many uses for such thermocouples. For example, when the thermocouples are placed in grooves already machined in tubular walls, the lack of good thermal and mechanical contact could produce serious errors in the temperature measurements. The present invention was conceived to overcome the above possible, undesirable features in a manner to be described hereinbelow.

SUMMARY OF THE INVENTION

It is the object of the present invention to provide an improved method for obtaining the desired insulation density in an insulated junction thermocouple while at the same time effecting a constant sheath outer diameter at the measurement junction thereof.

The above object has been accomplished in the present invention by fabricating an insulated junction thermocouple in the usual manner except that following the insulation removal step, a collet with an expanded end (or a flared clamp) is placed over the end of the thermocouple and a hard, polished tube expander is inserted into the thermocouple sheath to expand the sheath until it reaches the limit (2–10%) imposed by the flared clamp. The collet or clamp would also serve to keep the expanded sheath concentric with the rest of the thermocouple. Then, after the thermocouple wires are joined, the insulation repacked, and the end closure weld made, the expanded end of the thermocouple is then swaged to return it to its original diameter. Upon completion of the swaging step, the insulation would thus be compacted to the desired high density thus resulting in a thermocouple with a much improved response rate when it is utilized for a subsequent measurement operation.

DESCRIPTION OF THE PREFERRED METHOD

The present invention comprises an improved method for fabricating an insulated junction thermocouple for improving the response rate thereof comprising the steps of cutting a section out of one end of already-drawn sheathed thermocouple stock, removing the insulation from around the thermocouple wire ends of said section, placing a flared clamp over the end of said section, expanding the sheath of said section with a tube expander until it reaches the limit imposed by said clamp, removing said clamp and expander, welding said wire ends together to form the junction for said thermocouple, repacking the insulation about said junction, making an end closure weld for said thermocouple, and finally swaging the expanded sheath portion of said section about said junction to compact said repacked insulation and until said sheath is returned to its original diameter.

A thermocouple fabricated in accordance with the above method would thus have the insulation thereof compacted to the desired high density, be provided with a desired, final sheath diameter and have a much improved response rate in its measurement function. For example, the improvements in the response rates of thermocouples fabricated in accordance with the above method will be similar to those set forth in the above-mentioned application for patent; that is, an improvement of 30-50% in the response rate of compacted thermocouples as compared with noncompacted, thermocouples.

This invention has been described, by way of illustration rather than by limitation and it should be apparent that it is equally applicable in fields other than those described.

What is claimed is:

1. A method of fabricating an insulated junction thermocouple to improve the response rate thereof, comprising the steps of cutting a section out of one end of already-drawn sheathed thermocouple stock, removing the insulation from around the thermocouple wire ends of said section, placing a flared clamp over the end of said section, expanding the sheath of said section with a tube expander until it reaches the limit imposed by said clamp, removing said clamp and expander, welding said wire ends together to form the junction for said thermocouple, repacking the insulation about said junction, making an end closure weld for said thermocouple, and finally swaging the expanded sheath portion of said section about said junction to compact said repacked insulation and until said sheath is returned to its original diameter, whereby the compaction of said repacked insulation about said junction effects an improvement in the response rate of said thermocouple by at least 30% in a subsequent use thereof.

* * * * *